(12) United States Patent
Sharipov et al.

(10) Patent No.: US 10,645,197 B1
(45) Date of Patent: May 5, 2020

(54) METHOD AND A SYSTEM FOR A SECURE LINK-UP TO A NON-SECURE SYNCHRONOUS CONNECTION AND A MACHINE-READABLE CARRIER CONFIGURED FOR PERFORMING THE METHOD

(71) Applicant: Clario Tech Limited, London (GB)

(72) Inventors: Andrii Sharipov, Kyiv (UA); Iurii Skoliar, Kyiv (UA); Volodymyr Shelest, Kyiv (UA)

(73) Assignee: Clario Tech Limited, London (GB)

( * ) Notice: Subject to any disclaimer, the term of this patent is extended or adjusted under 35 U.S.C. 154(b) by 0 days.

(21) Appl. No.: 16/556,813

(22) Filed: Aug. 30, 2019

(30) Foreign Application Priority Data

Apr. 19, 2019 (UA) .............................. a 2019 04230

(51) Int. Cl.
*H04L 29/06* (2006.01)
*G06F 3/12* (2006.01)
*H04L 9/32* (2006.01)

(52) U.S. Cl.
CPC ............ *H04L 67/42* (2013.01); *G06F 3/1236* (2013.01); *G06F 3/1288* (2013.01); *H04L 63/101* (2013.01); *H04L 9/3247* (2013.01)

(58) Field of Classification Search
CPC ..... H04L 67/42; H04L 63/101; H04L 9/3247; G06F 3/1288; G06F 3/1236

USPC ......................................... 709/203, 227, 230
See application file for complete search history.

(56) References Cited

U.S. PATENT DOCUMENTS

| | | | |
|---|---|---|---|
| 7,970,814 B2 | 6/2011 | Leedberg et al. | |
| 10,356,064 B1* | 7/2019 | Howard | H04W 12/04 |
| 2002/0111996 A1* | 8/2002 | Jones | H04L 63/0428 |
| | | | 709/203 |
| 2013/0117400 A1* | 5/2013 | An | H04L 63/0823 |
| | | | 709/206 |
| 2014/0379823 A1* | 12/2014 | Wilsher | H04L 12/287 |
| | | | 709/206 |

\* cited by examiner

*Primary Examiner* — Michael Won
(74) *Attorney, Agent, or Firm* — Saliwanchik, Lloyd & Eisenschenk

(57) ABSTRACT

A computer system and methods for interaction between processes of software components of a computer system or elements of an operating system are provided. The method comprises: (i) making a request from the Client for a synchronous connection to the Server, (ii) verifying a unique name of the synchronous connection, (iii) making a request for a unique name of the synchronous connection via an asynchronous connection of the Client and Server, if there is no unique name of the synchronous connection among the created connections to the Server, (iv) verifying whether the Client is whitelisted in a list of Clients having permission to connect to the Server, (v) generating a unique name of the synchronous connection for Clients, (vi) creating a synchronous connection with the generated unique name, (vii) sending the name of the generated synchronous connection to the Client, (viii) linking up the Client to the Server.

14 Claims, 3 Drawing Sheets

METHOD AND A SYSTEM FOR A SECURE LINK-UP TO A NON-SECURE SYNCHRONOUS CONNECTION AND A MACHINE-READABLE CARRIER CONFIGURED FOR PERFORMING THE METHOD

CROSS-REFERENCE TO RELATED APPLICATION

This application claims the benefit of Ukrainian Application No. a 2019 04230, filed Apr. 19, 2019; which is hereby incorporated by reference in its entirety.

FIELD OF THE INVENTION

The invention relates to a computer system and to means of interaction between processes of computer system software components or operating system elements that are provided within the computer system. Also, the invention may be used for a means of interaction between processes of various computer systems connected between each other by a data exchange means.

BACKGROUND OF THE INVENTION

There is the following approach as to software component architecture when developing thereof for the computer system. Normally, the software component consists of a Client and a Server. The Client is a visual shell that is seen by a User of the computer system who interacts with the Client by sending commands. The Server is a service program module that performs a direct execution of the commands sent by the user via the Client. A connection must be established between the Client and Server in order for the Server to be able to receive commands sent via the Client thereto, as well as for the Server to be able to further exchange commands with the Client.

There are two types of the connection between the Server and Client—a synchronous one and an asynchronous one. The synchronous connection or the asynchronous connection has two streams: a rx stream (receiving data, including commands) and a tx stream (transmitting data, including commands). The asynchronous connection allows only a single data stream for each time interval (a cycle): the rx stream only or the tx stream only. In case of the synchronous connection, each rx stream or tx stream is provided separately, i.e. a simultaneous operation of the rx streams and tx streams is possible.

Use of the synchronous and asynchronous connection between the Client and the Server is illustrated on an exemplary computer system that performs a process responsible for printing and executed by the Server, and a process that allows the User to print a file and is executed via the Client. For example, the Client is a text editor via which the User prints a document, while the Server is a service software module Printer Daemon that is provided within the computer system. If the user sends a command to print three documents, the Client (the text editor) will send the following commands to the Server (Printer Daemon): "to print File No. 1", "to print File No. 2", "to print File No. 3". In case of the synchronous connection, the following occurs: the User sends, to the Server, a command to print a document via the Client and receives a response regarding a result of the command execution, as well as receives a direct communication for each document: "File No. 1 has been printed", "File No. 2 has not been printed, since the paper is out of stock", "File No. 3 is in a queue". If the printer is occupied, the Server will send a response that "File No. 1 cannot be printed, since the printer is occupied".

In the case of the asynchronous connection, the Client sends a command: "to print File No. 1, File No. 2, File No. 3" to the Server and waits for the Server to return the information about the specified files to the Client. Therewith, the Server processes three files simultaneously and, thus, the User may receive a response from the Server about simultaneous execution of the command for all three files. Therewith, the Server's response will not have a direct connection to the files, while the response will be provided randomly. For example, it will not indicate that File No. 1 has not been printed. This makes it necessary to correlate the response of the Server with particular files. As result, if the printer is occupied, the Server will process all three files followed by sending responses to the User's requests in a random order. For example, the User sends documents for printing in the following order: "File No. 1, File No. 2, File No. 3", while a printing means will receive a response that it is impossible to print the files in random order, such as "File No. 2, File No. 1, File No. 3".

In case of the asynchronous connection, while the Client waits for information from the Server, it cannot perform a subsequent task. Therewith, a number of messages between the Server and Client is increased, which overloads the connection.

The synchronous connection may be described by the following function:
y=f1(x)
z=f2(y)
result=f3(z)
Therewith, the asynchronous connection may be described by the following function:
f1(x)
wait
y=d1( . . . )
f2(y)
wait
z=d2 ( . . . )
f3(z)
wait
result=d3 ( . . . )
Therefore, creating software components, which operate on the synchronous connection, is much easier, than creating software components, which operate on the asynchronous connection. Therewith, the synchronous connection is faster than the asynchronous connection, since in case of the synchronous connection, the number of the requests to be sent is two times less. A drawback of the synchronous connection lies in that it is not safe. The synchronous connection name is hardcoded in the software component code. The synchronous connection name may be gained by decompiling the software component. If the connection name is available, any unauthorized process may be linked up thereto.

The asynchronous connection is safer, since it operatively comprises a block for filtering incoming processes. Through this, only the Clients that meet a particular set of established parameters are able to request a link-up to the Server. However, the asynchronous connection lacks the above-described advantages of the synchronous connection, namely, a data exchange speed and a simplicity of writing the software code, as compared to the synchronous connection.

Therefore, there is problem of making a choice between the synchronous and asynchronous connection for the inter-process interaction between computer components.

PRIOR ART

A method and an apparatus for providing a synchronous interface for an asynchronous communication, which are described in the U.S. Pat. No. 7,970,814B2 [Gregory Leedberg, Kenneth D. Carey, George W. Spencer, JR] published on Jun. 28, 2011, are known. The method and the apparatus provide a synchronous interface for an asynchronous communication via receiving a request from a Client for the asynchronous communication through the synchronous interface, which is provided in a computer system, followed by sending an asynchronous request for a service for execution of the asynchronous communication in response to the received request. The asynchronous service request has a unique client identifier that is associated with a wait condition for a result of execution of the asynchronous service request. The wait condition implies establishing a semaphore that is associated with a certain wait condition. Upon receipt of the result of the asynchronous service, the associated wait condition is deleted and the execution result is transmitted to the Client. Removal of the associated wait condition is performed by searching for a resulting unique client identifier in a hash table and by taking the semaphore off from the hash table row.

The described method and apparatus solve a problem of providing a synchronous communication between the Client and the Server (in case this type of connection is more appropriate) in a computer system that implies an asynchronous connection only. However, the advantages of the synchronous and asynchronous communication are not utilized in the known method and apparatus. Therewith, utilizing the wait condition to regulate an execution order for Client commands by using semaphores and a hash table does not allow to simplify a code for writing software components or to increase a speed of inter-process communication, rather it only allows to avoid premature termination of the Client command or unstable execution thereof.

SUMMARY OF THE INVENTION

The claimed invention aims to solve the problem of creating a safe synchronous connection between the Client and Server processes by performing a method for providing a secure link-up to a non-secure asynchronous connection, so that the method represents an alternative to the one known from the prior art. The claimed invention also aims to create a system for a secure link-up to a non-secure synchronous connection and a machine-readable medium in order to implement the claimed method.

The embodiments of the subject invention achieve an initiation of a connection by means of a secure asynchronous link-up followed by a secure synchronous connection. Due to initiation of a connection by means of the secure asynchronous link-up, the created synchronous connection is secure.

The link-up is a step of initiating the connection creation that precedes the creation of the connection itself. In order to connect the Client to the Server for data exchange, the Client is firstly linked up to the Server.

The asynchronous connection is used as the Client link-up to the Server. However, the data and messages exchange is carried out via the synchronous connection, rather than via the asynchronous connection. After the Client has been linked up to the Server, the asynchronous connection is not used during subsequent dialog between the Client and the Server, and the entire messages exchange is performed via the synchronous connection. As stated above, the synchronous connection bears advantages over the asynchronous connection in case of solving certain tasks (for example, for performing graphic calculations when changing a size of the interface window of a software component or an operation system, or for another similar function, wherein computations and calculations are used). As result, the inter-process interaction speed between the Client and Server is achieved, as well as the architecture of the inter-process interaction between the Client and Server is simplified when writing the code of the software components.

According a first implementation aspect of the present invention, a method of providing a secure link-up to a non-secure synchronous connection is implemented, the method comprising: (i) making a request from the Client for a synchronous connection to the Server, (ii) verifying a unique name of the synchronous connection among created connections to the Server, (iii) making a request for a unique name of the synchronous connection via an asynchronous connection of the Client and Server, if there is no unique name of the synchronous connection among the created connections to the Server, (iv) verifying, by the Server, whether the Client is whitelisted in a list of Clients that have permission to connect to the Server, according to the Client identifier, (v) generating, by the Server, a unique name of the synchronous connection for Clients that have permission to connect to the Server, (vi) creating, by the Server, a synchronous connection with the generated unique name, (vii) sending, by the Server, the name of the generated synchronous connection to the Client via an asynchronous connection, (viii) linking up the Client to the Server via the created synchronous connection with the generated unique name.

In one embodiment of the method, making a request from the Client for a synchronous connection to the Server may include making a request for link-up to the Server via the Client synchronous connection and a request for a unique name of the synchronous connection via the client asynchronous link-up.

According to another embodiment of the method, verifying the unique name of the synchronous connection among the created connections to the Server may include making a request for a unique name of the synchronous connection from the Client to the Server via the asynchronous link-up.

According to another embodiment of the method, a process identifier (process id) and/or a software application identifier (bundle id) and/or a digital signature may be used as the Client identifier.

According to another embodiment of the method, a key according to the UUID Standard may be used as the unique name of the synchronous connection.

According to a second implementation aspect of the invention, a computer system for providing a secure link-up to a non-secure synchronous connection is implemented, the system comprising, coupled with each other via a communication interface, a processor device and a means for data operating storage and processing, and a means for data persistence that comprises a set of instructions for Client processes and Server processes, which are configured to be executed by the processor device by using the means for data operating storage and processing, wherein the Client and Server are simultaneously connected by a synchronous and an asynchronous connection, wherein the set of machine instructions for the Client processes is configured to: send a request for a synchronous connection to the Server; verify a unique name of the synchronous connection among the created connections to the Server; send a request for a unique name of the synchronous connection via an asynchronous connection between the Client and Server, if there is no unique name of the synchronous connection, while the set of machine instructions for the Server processes is configured to: verify whether the Client is whitelisted in a list of Clients that have permission to connect to the Server, according to the Client identifier; generate a unique name of the synchronous connection for the Clients that have permission to connect to the Server; create a synchronous connection with the generated unique name; send the name of the generated synchronous connection to the Client via the asynchronous connection; link up the Client to the Server via the created synchronous connection with the generated unique name.

In one embodiment, the set of machine instructions for the Client processes may be further configured to send a request for link-up to the Server via the client synchronous connection and to send a request for a unique name of the synchronous connection via the client asynchronous link-up.

According to another embodiment of the system, the set of machine instructions for the Client processes may be further configured to send a request for a unique name of the synchronous connection from the Client to the Server via the asynchronous link-up.

According to another embodiment of the system, a process identifier (process id) and/or a software application identifier (bundle id) and/or a digital signature may be used as the Client identifier.

According to another embodiment of the system, a key according to the UUID Standard may be used as the unique name of the synchronous connection.

According to another embodiment of the system, the Client may comprise a software visual shell that is configured to initiate processes of the synchronous and/or asynchronous connection to the Server.

According to another embodiment of the system, the Server may comprise a software service module that is configured to execute processes initiated via the software visual shell of the Client.

According to a third implementation aspect of the invention, at least one machine-readable medium is implemented, the medium comprising a set of machine instructions configured to be executed by a processor device: sending a request for a synchronous connection to the Server; verifying a unique name of the synchronous connection among the created connections to the Server; sending a request for a unique name of the synchronous connection via an asynchronous connection between the Client and Server, if there is no unique name of the synchronous connection among the created connections to the Server, while a set of machine instructions for the Server processes is configured to: verify whether the Client is whitelisted in a list of Clients that have permission to connect to the Server, according to the Client identifier; generate a unique name of the synchronous connection for the Clients that have permission to connect to the Server; create a synchronous connection with the generated unique name; send the name of the synchronous connection to the Client via an asynchronous connection; link up the client to the Server via the created synchronous connection with the generated unique name.

In one embodiment, a memory storage device may comprise a set of machine instructions for the Client processes that is further configured to send a request for link-up to the Server via the Client synchronous connection and to send a request for a unique name of the synchronous connection via the client asynchronous link-up.

According to another embodiment, the machine-readable medium may comprise a set of machine instructions for the Client processes that is further configured to send a request for a unique name of the synchronous connection from the Client to the Server via an asynchronous link-up.

According to another embodiment, the machine-readable medium may comprise a set of machine instructions, which use a process identifier (process id) and/or a software application identifier (bundle id) and/or a digital signature as the Client identifier.

According to another embodiment, the machine-readable medium may comprise a set of machine instructions, which use a key according to the UUID Standard as the unique name of the synchronous connection.

According to another embodiment, the machine-readable medium may comprise a set of machine instructions, wherein the Client comprises a software visual shell that is configured to initiate processes of the synchronous and/or asynchronous connection to the server.

According to another embodiment, the machine-readable medium may comprise a set of machine instructions, wherein the Server comprises a software service module that is configured to execute processes initiated by the software visual shell of the Client.

It should be appreciated that the foregoing general description and further detailed description are solely illustrative and explanatory, and do not limit the claimed invention.

BRIEF DESCRIPTION OF THE DRAWINGS

The provided drawings, which are included into the present description of the invention and constitute its part, illustrate embodiments of the invention and serve to explain the invention principles along with the description.

DETAILED DESCRIPTION

Illustrative embodiments of the invention are described hereinafter in detail, which examples are illustrated on the figures. Implementations of the illustrative embodiments, which are set forth in the further description, do not encompass all implementations, which may exist according to the invention, rather they server solely for an additional explanation of the disclosure of the invention.

Figure 1:
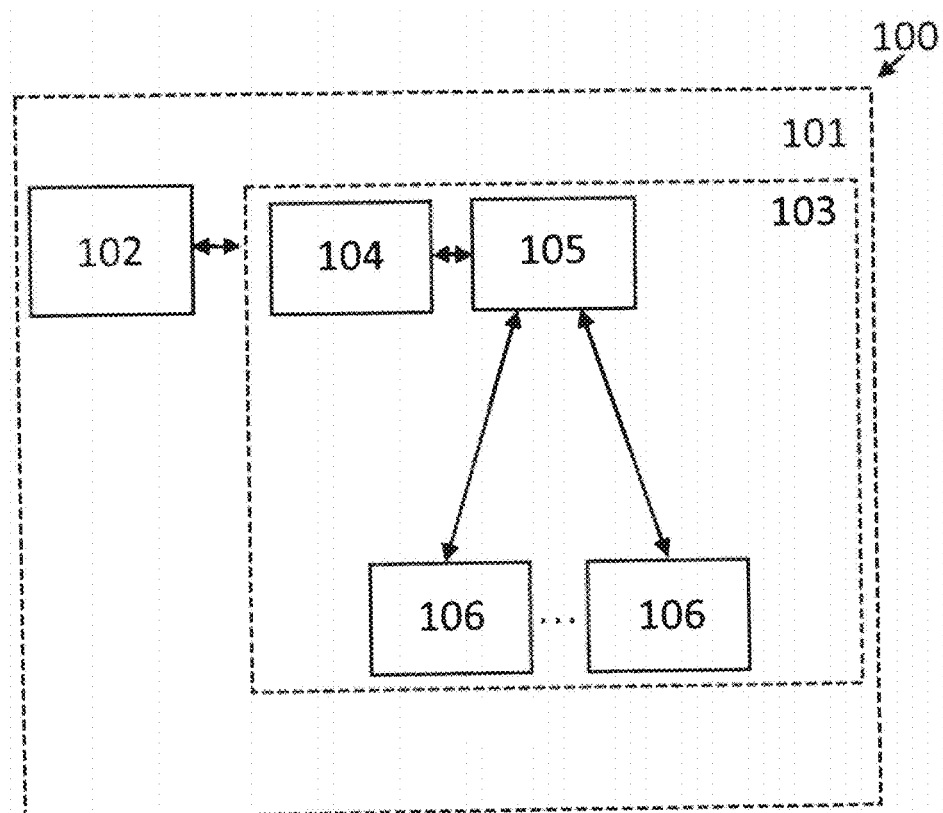
FIG. 1 is a schematic diagram that shows an architecture of software components having an inter-process interaction between a Client and a Server according to an embodiment of the subject invention.

According to FIG. 1, a computer system 100 for a secure link-up of a non-secure synchronous connection comprises at least one computing device 101 having one or several processors 102 and a machine-readable medium 103 coupled thereto. The computing device 101 may be a personal computer, a portable computer (a laptop) and similar devices equipped with a means for inputting information into the computer system 100 (a keyboard, a touch pad, a computer mouse etc.) or configured so that they are able to be coupled with such means, and a means for outputting information (a screen, a printer etc.). The processor 102 may be Ax series processor by the Apple Inc© company or series Ivy Bridge, Haswell, Skylake processor by the Intel Core© company and the like. The machine-readable medium 103 comprises an external memory, for example, a solid-state drive (SSD) to store application programs and data, and an internal memory that includes a read-only memory (ROM) and random access memory (RAM), which are configured to store a set of instructions configured to be executed by the processor 102. The medium 103 is equipped with an operation system 104, for example, Mac OS by the Apple Inc© company, Windows by the Microsoft© company or any other well-known operation system. The set of instructions includes, in particular, an operation sequence for performing an inter-process communication for the operation system 104 and between software components installed on the, machine-readable medium 103, in particular, those equipped with the Server 105 and a set of the Clients 106, which are connected to the Server 105.

Figure 2:
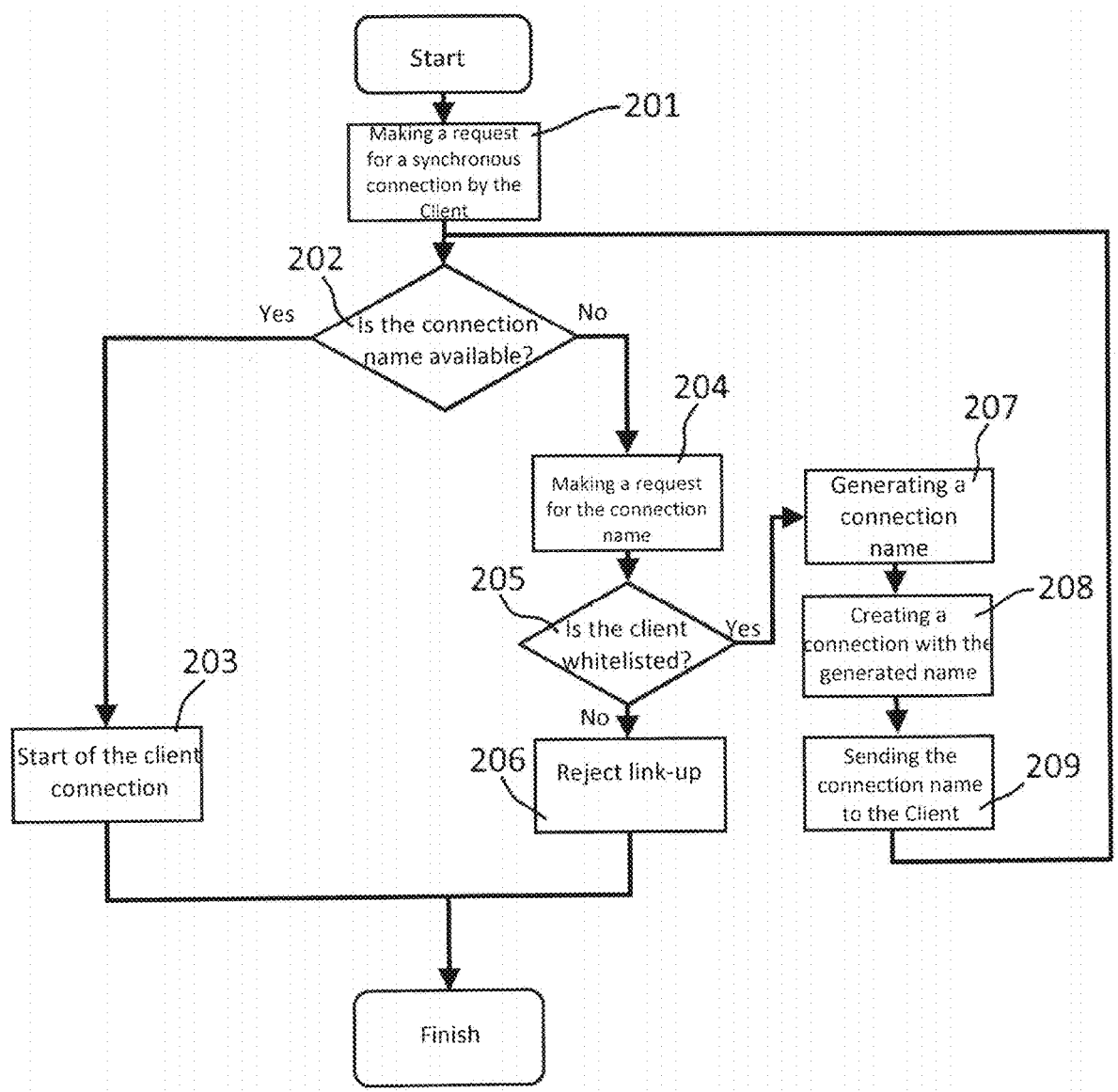
FIG. 2 is a flow chart of creating a secure synchronous Client-Server connection with a unique name according to an embodiment of the subject invention.

FIG. 2 shows a flow chart of achievement of the claimed technical effect by the invention, namely, creation of a secure synchronous Client-Server connection with a unique name. According to FIG. 2, a request 201 for a synchronous connection to the Server 105 is made from the Client 106. Then, the Client 106 performs verification 202 to determine whether the name of the synchronous connection among the created Server 105 connections is available thereto. If the unique name of the synchronous connection is available, the Client 106 will be linked up to the Server 105 (start of the client synchronous connection 203). If there is no unique name of the synchronous connection among the created Server 105 connections, a request 204 for a unique name of the synchronous connection via an asynchronous connection of the Client 106 to the Server 105 will be made. Then, the Server 105 performs verification 205 to determine whether the Client 106 is whitelisted in a list of Clients that are permitted to connect to the Server 105 ("a whitelist"), according to the Client 106 identifier. If the Client 106 is not whitelisted in the list of Clients that are permitted to connect to the Server 105, the Client 106 will be rejected 206 from linking up to the Server 105. If the Client 106 is whitelisted in the list of Clients that are permitted to connect to the Server 105, the Server 105 will generate 207 a unique name of the synchronous connection for the Client 106 that is permitted to connect to the Server 105. After generation of the unique name of the synchronous connection, the Server 105 creates 208 a synchronous connection with the generated unique name. Then, the Server 105 sends 209 the name of the generated synchronous connection to the Client 106 via the asynchronous connection followed by link-up of the Client 106 to the Server 105 via the created synchronous connection with the generated unique name, by means of stages 202 and 203.

Therefore, the Client 106 has been "introduced" to the Server 105 via the asynchronous link-up followed by generation of the unique name for the synchronous connection. The generated unique name is not hardcoded in the software component code and, thus, it is impossible to be learnt by decompiling the software. The unique name for the synchronous connection is generated every time when the Client 106 accesses the Server 105. After the asynchronous "introduction" between the Client 106 and the Server 105, further inter-process communication of the Client 106 with the Server 105 occurs via the synchronous connection with the generated unique name, which provides the connection security. In order to increase the security, the claimed invention utilizes the asynchronous connection functionality using a pre-created list of attributes of Clients 106 and processes (a whitelist), which are allowed to initiate a link-up to the Server 105. Afterwards, after all of the "non-whitelisted" Clients 106 and processes have been filtered out, a unique name of the synchronous connection is generated, according to which, further inter-process communication of the "whitelisted" Clients 106 and processes with the Server 105 occurs.

Figure 3:
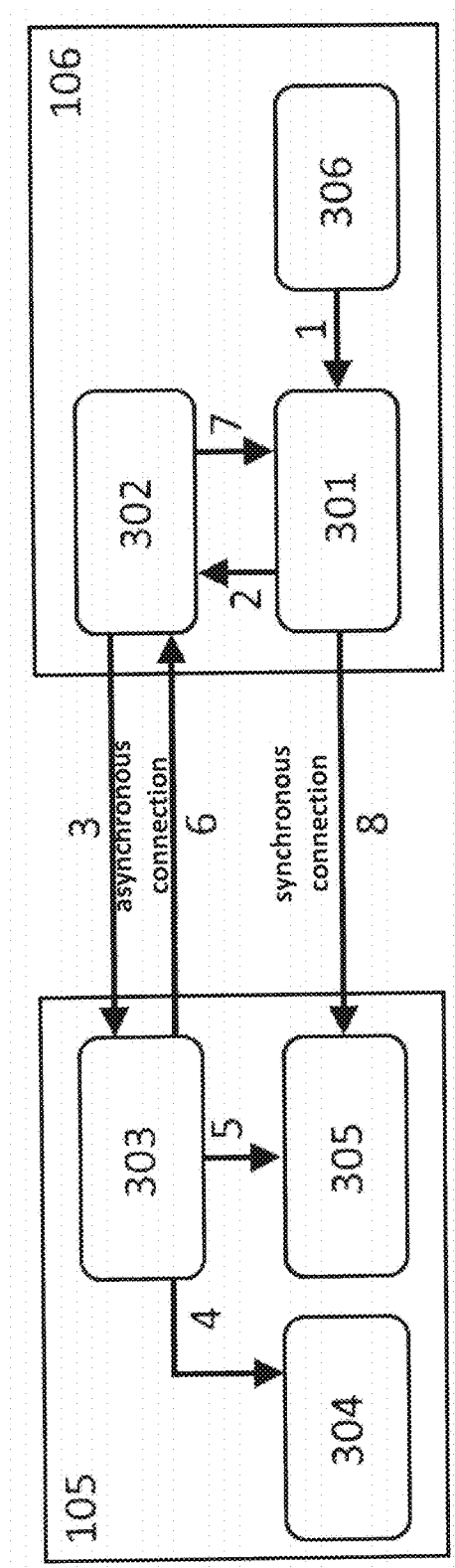
FIG. 3 is a schematic diagram that shows a step-by-step creation of a secure synchronous Client-Server connection with a unique name, according to an embodiment of the subject invention.

FIG. 3 shows the following exemplary process of creating a secure synchronous Client-Server connection with a unique name. Each process stage is numbered on FIG. 3. The example shows printing a document by the User of the computer system 100 via a text editor installed on the medium 103 of the computing device 101. In this case, the text editor (for example, Word©) is the Client 106, while the Printer Daemon server module is the Server 105. The Server 105 and the Client 106 are controlled by the processor 102 of the computing system 101. Using the text editor includes using its functions, such as insertion of an image, import of a table or printing a file and a plurality of other ones. Upon call, each of these functions will be an initiator of the Server 105 connection. The Client 106 implies a client synchronous connection module 301 and a client asynchronous link-up 302 to the Server 105. The Server 105 implies a server asynchronous link-up module 303, a list of Clients that are permitted to connect to the Server 105 ("a white list" 304) and a server synchronous connection module 305. According to FIG. 3, at the stage 1, the User calls a printing function (an initiator 306) by pressing the button "print document" on the interface of the text editor (the Client 106) that initiates the creation of the synchronous connection to the Printer Daemon (the Server 105). To this end, the initiator 306 "refers" to the client synchronous connection module 301 which is responsible for the synchronous connection between the Client 106 and the Server 105. In order to connect to the Server 105, the client synchronous connection module 301 needs a name of the connection. At the next stage, use of the technical solution according to the invention starts. In a usual case, the connection name is hardcoded in the software component code by default, in this example, a text editor. Therefore, the client synchronous connection module 301 is familiar with the connection name. As stated above, when decompiling the software component with the "hardcoded" connection name, it is possible to obtain the connection name and to link up to the Server 105, which is not secure. The proposed solution is based on the fact that the client synchronous connection module 301 does not have the connection name that is "hardcoded" in the program code of the text editor. Therefore, at the Stage 2, the client synchronous connection module 301 refers to the client asynchronous link-up module 302 in order to obtain the connection name, according to which, it may link up to the Server 105. Therewith, the name of the asynchronous link-up is "hardcoded" in the program code of the text editor. However, the name of the asynchronous link-up is used for the "introduction" between the Client 106 and the Server 105 only, while the data transmission is made via the synchronous connection with the unique generated name. Therefore, the information about the name of the asynchronous connection (in case of decompiling the software code) will not allow to perform an unauthorized link-up to the Server 105. At the Stage 3, the client asynchronous link-up module 302 via the asynchronous link-up and the server asynchronous link-up module 303 refer to the Server 105. At the Stage 4, upon receipt of the request from the client asynchronous link-up module 302, the server asynchronous link-up module 303 verifies whether the Client (106) is whitelisted in the list of Clients that are permitted to connect to the Server 105, according to the Client identifier (in the "whitelist" 304). Preferably, the "whitelist" 304 or rules thereof are created during the process of forming a software application and "hardcoded" in the software code. However, it is possible to form the "whitelist" 304 or rules thereof dynamically, i.e. during the inter-process communication between the Server 105 and the Client 106, rather than at the stage of forming the software code. Such parameters as process id, bundle id, digital signature and other similar ones may be used as the Client identifier to verify whether it is whitelisted in the "whitelist" 304. At the Stage 5, after verification whether the Client 106 is whitelisted in the "whitelist" 304 (the Client 106 is allowed to link up to the Server 105), the server asynchronous link-up module 303 generates a unique name of the synchronous connection and creates a point of entry—a server synchronous connection module 305. At the stage 6, upon creation of the server synchronous connection module 305 with a unique name, the unique connection name is returned via the asynchronous connection through the server asynchronous link-up module 303 to the client asynchronous link-up module 302 (in response to the request at the Stage 3). At the Stage 7, the client asynchronous link-up module 302 transmits the unique connection name to the client synchronous connection module 301. At the Stage 8, the Client 106 creates the synchronous connection with a unique name by means of the client synchronous connection module 301 and begins exchanging data and messages with the Server 105 via the synchronous connection and via the entry point that has been preliminary created by the Server 105 at the Stage 5 (the server synchronous connection module 305), in particular, it executes the User's command to print documents via the synchronous connection that is already secured.

Therefore, the embodiments of the invention inhibits occurrence of a case, when harmful software that has a connection name that is "hardcoded" in the code of the software component links up to the Server 105 in a unauthorized fashion, intercepts a file that has been sent for printing and transmits it to third parties.

The hereinafter provided example of the inter-process interaction between a text editor as the Client and a printer as the Server is only one of a plurality of exemplary applications of the embodiments of the invention. Similarly, the embodiments of the invention may be used in such software components as system utilities, antiviruses, graphic processing applications and in any other field of application of computer systems that perform an inter-process communication between a Client and a Server.

We claim:

1. A method for providing a secure link-up to a non-secure synchronous connection, the method comprising:
   (i) making a request from a Client for a synchronous connection to a Server,
   (ii) verifying a unique name of the synchronous connection among created connections to the Server,
   (iii) making a request for a unique name of the synchronous connection via an asynchronous connection of the Client and Server, if there is no unique name of the synchronous connection among the created connections to the Server,
   (iv) verifying, by the Server, whether the Client is whitelisted in a list of Clients that are permitted to connect to the Server, according to a Client identifier, wherein a process identifier (process id) and/or a software application identifier (bundle id) and/or a digital signature is defined as the Client identifier,
   (v) generating, by the Server, a unique name of the synchronous connection for Clients that are permitted to connect to the Server, wherein a key according to the UUID Standard is defined as the unique name of the synchronous connection,
   (vi) creating, by the Server, a synchronous connection with the generated unique name,
   (vii) sending, by the Server, the name of the generated synchronous connection to the Client via an asynchronous connection, and
   (viii) linking up the Client to the Server via the created synchronous connection with the generated unique name.

2. The method according to claim 1, wherein the making a request from the Client for a synchronous connection to the Server includes making a request for link-up to the Server via the Client synchronous connection and making a request for a unique name of the synchronous connection via the client asynchronous link-up.

3. The method according to claim 1, wherein the verifying the unique name of the synchronous connection among the created connections to the Server includes making a request for a unique name of the synchronous connection from the Client to the Server via the asynchronous link-up.

4. A computer system for providing a secure link-up to a non-secure synchronous connection, the system comprising, coupled with each other via a communication interface, a processor device, a means for data operating storage and processing, and a means for data persistence that comprises a set of instructions for Client processes and Server processes, which are configured to be executed by the processor device by the means for data operating storage and processing, wherein the Client and Server are simultaneously connected by a synchronous and an asynchronous connection,
   wherein the set of machine instructions for the Client processes is configured to:
     send a request for a synchronous connection to the Server,
     verify a unique name of the synchronous connection among the created connections to the Server, and
     send a request for a unique name of the synchronous connection via an asynchronous connection between the Client and Server, if there is no unique name of the synchronous connection, and
   wherein the set of machine instructions for the Server processes is configured to:
     verify whether the Client is whitelisted in a list of Clients that have permission to connect to the Server, according to a Client identifier, wherein a process identifier (process id) and/or a software application identifier (bundle id) and/or a digital signature is defined as the Client identifier,
     generate a unique name of the synchronous connection for the Clients that have permission to connect to the Server, wherein a key according to the UUID Standard is defined as the unique name of the synchronous connection,
     create a synchronous connection with the generated unique name, send the name of the generated synchronous connection to the Client via the asynchronous connection, and
     link up the Client to the Server via the created synchronous connection with the generated unique name.

5. The system according to claim 4, wherein the set of machine instructions for the Client processes is further configured to send a request for link-up to the Server via the client synchronous connection and to send a request for a unique name of the synchronous connection via the client asynchronous link-up.

6. The system according to claim 4, wherein the set of machine instructions for the Client processes is further configured to send a request for a unique name of the synchronous connection from the Client to the Server via the asynchronous link-up.

7. The system according to claim 4, wherein the Client comprises a software visual shell that is configured to initiate processes of the synchronous and/or asynchronous connection to the Server.

8. The system according to claim 4, wherein the Server comprises a software service module that is configured to execute processes initiated via the software visual shell of the Client.

9. The system according to claim 7, wherein the Server comprises a software service module that is configured to execute processes initiated via the software visual shell of the Client.

10. A non-transitory computer readable medium comprising machine readable instructions executable by computing hardware, the non-transitory computer readable medium comprising instructions for:
    sending a request for a synchronous connection to the Server,
    verifying a unique name of the synchronous connection among the created connections to the Server,
    sending a request for a unique name of the synchronous connection via an asynchronous connection between the Client and Server, if there is no unique name of the synchronous connection among the created connections to the Server,
    wherein a set of machine instructions for the Server processes is configured to:
    verify whether the Client is whitelisted in a list of Clients that have permission to connect to the Server, according to a Client identifier, wherein a process identifier (process id) and/or a software application identifier (bundle id) and/or a digital signature is defined as the Client identifier,
    generate a unique name of the synchronous connection for the Clients that have permission to connect to the Server, wherein a key according to the UUID Standard is defined as the unique name of the synchronous connection,
    create a synchronous connection with the generated unique name,
    send the name of the synchronous connection to the Client via an asynchronous connection, and
    link up the Client to the Server via the created synchronous connection with the generated unique name.

11. The non-transitory computer readable medium according to claim 10, comprising a set of machine instructions for the Client processes that is further configured to send a request for link-up to the Server via the Client synchronous connection and to send a request for a unique name of the synchronous connection via the client asynchronous link-up.

12. The non-transitory computer readable medium according to claim 10, comprising a set of machine instructions for the Client processes that is further configured to send a request for a unique name of the synchronous connection from the Client to the Server via an asynchronous link-up.

13. The non-transitory computer readable medium according to claim 10, comprising a set of machine instructions, wherein the Client comprises a software visual shell that is configured to initiate processes of the synchronous and/or asynchronous connection to the server.

14. The non-transitory computer readable medium according to claim 13, comprising a set of machine instructions, wherein the Server comprises a software service module that is configured to execute processes initiated by the software visual shell of the Client.

* * * * *